(12) United States Patent
Ha et al.

(10) Patent No.: US 10,518,834 B2
(45) Date of Patent: Dec. 31, 2019

(54) METHOD AND APPARATUS FOR CONTROLLING SELF-BALANCING VEHICLE

(71) Applicant: Beijing Xiaomi Mobile Software Co., Ltd., Beijing (CN)

(72) Inventors: Xiaolin Ha, Beijing (CN); Xing Yong, Beijing (CN); Xiaotong Zhang, Beijing (CN); Shangquan Lin, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 170 days.

(21) Appl. No.: 15/613,575

(22) Filed: Jun. 5, 2017

(65) Prior Publication Data

US 2018/0029661 A1 Feb. 1, 2018

(30) Foreign Application Priority Data

Jul. 29, 2016 (CN) .......................... 2016 1 0619170

(51) Int. Cl.
| | |
|---|---|
| *B62K 11/00* | (2006.01) |
| *B62K 23/08* | (2006.01) |
| *B60L 3/12* | (2006.01) |
| *B62J 99/00* | (2009.01) |

(52) U.S. Cl.
CPC .............. *B62K 11/007* (2016.11); *B60L 3/12* (2013.01); *B62J 99/00* (2013.01); *B62K 23/08* (2013.01); *B60L 2200/16* (2013.01); *B60L 2250/26* (2013.01); *B62J 2099/002* (2013.01); *B62J 2099/0013* (2013.01); *B62K 2204/00* (2013.01); *Y02T 10/7258* (2013.01)

(58) Field of Classification Search
CPC .............................. B62K 11/007; B62K 23/08
See application file for complete search history.

(56) References Cited

U.S. PATENT DOCUMENTS

| | | | | |
|---|---|---|---|---|
| 7,703,568 B2 * | 4/2010 | Ishii | ........................ | A63C 17/12 |
| | | | | 180/218 |
| 9,101,817 B2 * | 8/2015 | Doerksen | ................ | A63C 17/12 |
| 9,393,483 B2 * | 7/2016 | Tan | .......................... | A63C 17/12 |
| 9,592,875 B2 * | 3/2017 | Takeda | ................... | B62K 23/08 |
| 9,604,692 B1 * | 3/2017 | Kim | ........................ | B62K 23/08 |
| 2011/0220427 A1 | 9/2011 | Chen | | |

(Continued)

FOREIGN PATENT DOCUMENTS

| | | |
|---|---|---|
| CN | 103770872 A | 5/2014 |
| CN | 104494749 A | 4/2015 |

(Continued)

OTHER PUBLICATIONS

English translation of CN 105270527 A, retrieved from Espacenet (www.epo.org) on Jan. 15, 2019, 7 pages. (Year: 2019).*

(Continued)

*Primary Examiner* — Todd M Melton
(74) *Attorney, Agent, or Firm* — Finnegan, Henderson, Farabow, Garrett & Dunner, L.L.P.

(57) ABSTRACT

A method for controlling a self-balancing vehicle, includes: acquiring a state of a parameter input from a user through a pedal of the self-balancing vehicle; and when the state of the parameter indicates that a change has occurred in the parameter, controlling operation of the self-balancing vehicle according to the change.

17 Claims, 11 Drawing Sheets

(56) References Cited

U.S. PATENT DOCUMENTS

2017/0088212 A1* 3/2017 Edney .................. B60W 40/13
2017/0151995 A1* 6/2017 Chen ................... B62K 11/007

FOREIGN PATENT DOCUMENTS

| | | | |
|---|---|---|---|
| CN | 105270527 | A | 1/2016 |
| CN | 105398522 | A | 3/2016 |
| CN | 105539657 | A | 5/2016 |
| CN | 105711726 | A | 6/2016 |
| GB | 2525677 | A | 11/2015 |
| JP | 2004140949 | A | 5/2004 |
| JP | 2006008013 | A | 1/2006 |
| JP | 4599907 | B2 | 12/2010 |

OTHER PUBLICATIONS

Extended Search Report for European Application No. 17163907.3 from the European Patent Office, dated Oct. 9, 2017.
International Search Report of PCT Application No. PCT/CN2016/107707, dated May 4, 2017, issued by the ISA/CN—State Intellectual Property Office of the P.R. China.
English version of International Search Report of PCT Application No. PCT/CN2016/107707, dated May 4, 2017, issued by the ISA/CN—State Intellectual Property Office of the P.R. China.

* cited by examiner

METHOD AND APPARATUS FOR CONTROLLING SELF-BALANCING VEHICLE

CROSS-REFERENCE TO RELATED APPLICATIONS

The present application is based upon and claims priority to Chinese Patent Application No. 201610619170.7, filed on Jul. 29, 2016, the entire contents of which are incorporated herein by reference.

TECHNICAL FIELD

The present disclosure generally relates to the field of automatic control technology, and more particularly, to a method and an apparatus for controlling a self-balancing vehicle.

BACKGROUND

A self-balancing vehicle, also known as an electric self-balancing vehicle, is a new emerging transportation tool for a short distance.

An acceleration sensor and a gyroscope are provided inside the self-balancing vehicle, which may control the self-balancing vehicle according to a posture of a user's body. When it is monitored that a center of gravity of the body of the user standing on a pedal of the self-balancing vehicle moves forward, the self-balancing vehicle is controlled to speed up. When it is monitored that the body center of gravity of the user moves backward, the self-balancing vehicle is controlled to slow down.

SUMMARY

According to a first aspect of the present disclosure, there is provided a method for controlling a self-balancing vehicle, comprising: acquiring a state of a parameter input from a user through a pedal of the self-balancing vehicle; and when the state of the parameter indicates that a change has occurred in the parameter, controlling operation of the self-balancing vehicle according to the change.

According to a second aspect of the present disclosure, there is provided an apparatus for controlling a self-balancing vehicle, comprising: a processor; and a memory for storing instructions executable by the processor, wherein the processor is configured to: acquire a state of a parameter input from a user through a pedal of the self-balancing vehicle; and when the state of the parameter indicates that a change has occurred in the parameter, control operation of the self-balancing vehicle according to the change.

According to a third aspect of the present disclosure, there is provided a non-transitory computer-readable storage medium having stored therein instructions that, when executed by a processor of an apparatus, cause the apparatus to perform a method for controlling a self-balancing vehicle, the method comprising: acquiring a state of a parameter input from a user through a pedal of the self-balancing vehicle; and when the state of the parameter indicates that a change has occurred in the parameter, controlling operation of the self-balancing vehicle according to the change.

It is to be understood that both the foregoing general description and the following detailed description are exemplary and explanatory only and are not restrictive of the present disclosure.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of apparatuses and methods consistent with aspects related to the present disclosure as recited in the appended claims.

Exemplary embodiments of the present disclosure provide methods for controlling a self-balancing vehicle. For example, the methods may be applicable in a self-balancing vehicle that has at least one pedal.

Figure 1:
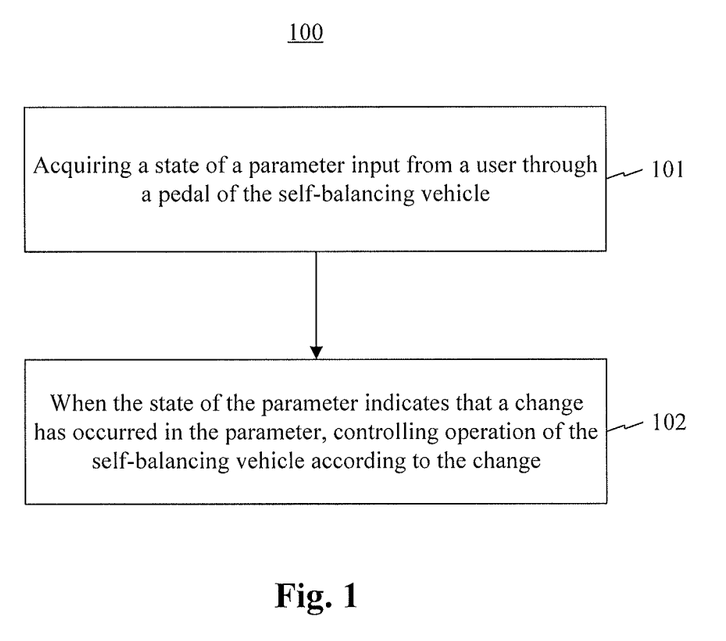
FIG. 1 is a flow chart of a method for controlling a self-balancing vehicle according to an exemplary embodiment.

FIG. 1 is a flow chart of a method 100 for controlling a self-balancing vehicle according to an exemplary embodiment. As shown in FIG. 1, the method 100 includes the following steps.

In step 101, a state of a parameter input from a user through a pedal of the self-balancing vehicle is acquired.

In the exemplary embodiment, the parameter includes at least one of: a pressure parameter, or a contact area parameter between a foot of the user and the pedal of the self-balancing vehicle. Accordingly, when the user uses the self-balancing vehicle, the user may control operation of the self-balancing vehicle through the user's foot.

In step 102, when the state of the parameter indicates that a change has occurred in the parameter, operation of the self-balancing vehicle is controlled according to the change.

In the exemplary embodiment, when the user uses the self-balancing vehicle, in order to accurately control the operation of the self-balancing vehicle, when the state of the parameter indicates that a change has occurred in the parameter, it may be further judged whether a change in a value of the parameter is larger than a threshold value. If the change in the value of the parameter is larger than the threshold value, the operation of the self-balancing vehicle is controlled according to the change.

For example, the threshold value is preset for the parameter of the self-balancing vehicle.

It should be understood that the change in the value of the parameter may be an increase in the value of the parameter, or a decrease in the value of the parameter. Generally, different changes correspond to different manners for controlling the self-balancing vehicle.

In one exemplary embodiment, when it is monitored that the value of the parameter decreases, it may be further judged whether a decrease in the value of the parameter is larger than a first threshold value. If the decrease in the value of the parameter is larger than the first threshold value, the self-balancing vehicle is controlled to slow down according to the decrease in the value.

In the present embodiment, the self-balancing vehicle may be controlled to slow down according to a magnitude of the decrease in the value of the parameter. The larger the decrease is, the larger the speed value of the self-balancing vehicle decreases.

In one exemplary embodiment, when the user uses the self-balancing vehicle having two pedals, a contact area between the user's feet and the self-balancing vehicle may be acquired. When the user uplifts a front part of each foot, it may be monitored that the contact area between the user's feet and the self-balancing vehicle decreases. At this time, it may be further judged whether a decrease in the contact area is larger than a first threshold value. If the decrease in the value is larger than the first threshold value, the self-balancing vehicle is controlled to slow down according to the decrease in the value. Thereby, the user may slow down the self-balancing vehicle by changing a state of the user's feet on the pedals of the self-balancing vehicle, which may avoid that the user loses balance due to the user's leaning backward and the backward moving of the center of gravity of the user's body. Thereby, safety of the self-balancing vehicle is improved.

In one exemplary embodiment, when it is monitored that the value of the parameter increases, it may be further judged whether an increase in the value of the parameter is larger than a second threshold value. If the increase in the value of the parameter is larger than the second threshold value, the self-balancing vehicle is controlled to speed up according to the increase in the value.

In the present embodiment, the self-balancing vehicle may be controlled to speed up according to a magnitude of the increase in the value of the parameter. The larger the increase in the value is, the larger the speed value of the self-balancing vehicle increases.

For example, when the user uses the self-balancing vehicle, a distribution of a pressure parameter on the pedal of the self-balancing vehicle may be analyzed. When it is monitored that a pressure value of the user's heel on the pedal increases, it may be further judged whether an increase in the pressure value is larger than a second threshold value. If the increase in the pressure value is larger than the second threshold value, the self-balancing vehicle is controlled to speed up according to the increase in the pressure value. Thereby, the user may conveniently control the self-balancing vehicle to speed up through the user's foot.

It should be understood that, both the first threshold value and the second threshold value are preset threshold values of the self-balancing vehicle. The first threshold value may be the same as or different from the second threshold value, which is not limited in the present disclosure.

In the method 100, during a process of controlling operation of the self-balancing vehicle, the user may control the self-balancing vehicle to speed up or slow down by changing the state of the user's feet on the self-balancing vehicle, which facilitates the user to control the self-balancing vehicle, and avoids that the user loses balance due to the user's leaning backward and the backward moving of the center of gravity of the user's body. Thereby, the safety of the self-balancing vehicle is improved.

Further, the self-balancing vehicle is controlled according to the change in the parameter input through the pedal of the self-balancing vehicle. The user may conveniently control the speed of the self-balancing vehicle by the user's foot, which increases driving safety.

In exemplary embodiments, after the operation of the self-balancing vehicle is controlled according to the change in the parameter, the method 100 may further include, when the state of the parameter indicates that the parameter is the same as that before the change occurs, controlling the self-balancing vehicle to maintain a current speed.

For example, during the user use of the self-balancing vehicle, assuming that the user puts the user's entire foot on the pedal of the self-balancing vehicle, the contact area between the user's foot and the pedal of the self-balancing vehicle acquired by the self-balancing vehicle is measured to be A at this time. In order to slow down the self-balancing vehicle, the user uplifts a front part of the user's foot. Therefore it may be determined that the contact area between the user's foot and the pedal decreases by comparison, and it is assumed that the acquired contact area is B during the process of slowing down the self-balancing vehicle. After a speed of the self-balancing vehicle reaches a desired speed, the user may put the entire foot on the pedal of the self-balancing vehicle again. At this time, the contact area between the user's foot and the pedal of the self-balancing vehicle changes from B back to A, and it may be determined that the contact area is the same as that before the change occurs. Accordingly, a current speed of the self-balancing vehicle may be acquired and the self-balancing vehicle is controlled to be operated at the current speed.

Figure 2:
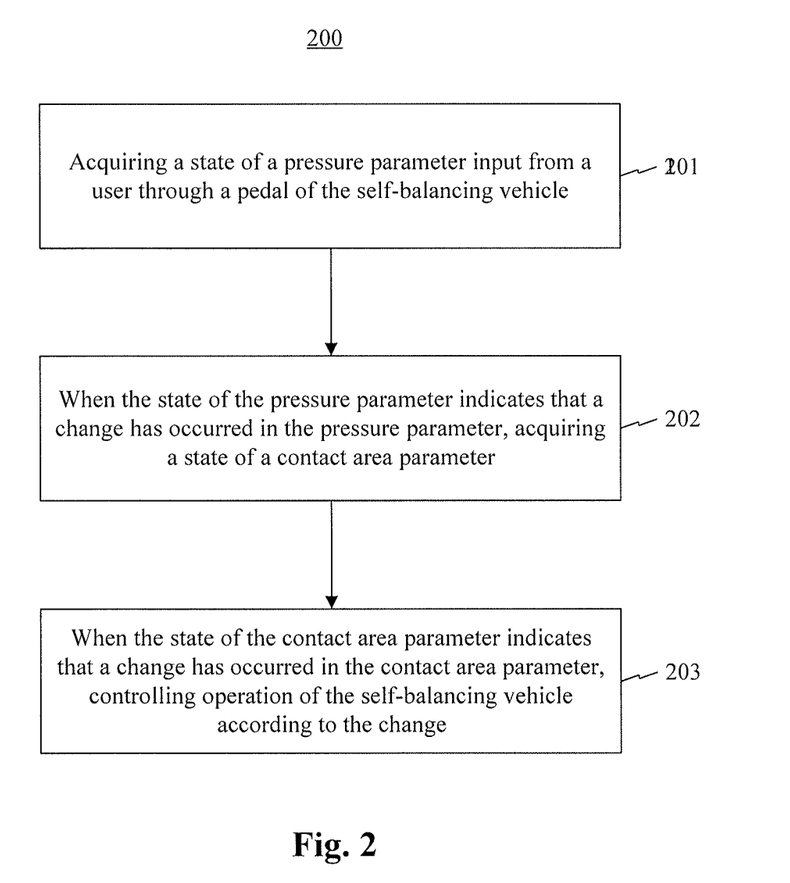
FIG. 2 is a flow chart of a method for controlling a self-balancing vehicle according to another exemplary embodiment.

FIG. 2 is a flow chart of a method 200 for controlling a self-balancing vehicle according to another exemplary embodiment. As shown in FIG. 2, the method 200 includes the following steps.

In step 201, a state of a pressure parameter input from a user through a pedal of the self-balancing vehicle is acquired.

In the exemplary embodiment, to allow the user to control operation of the self-balancing vehicle through the user's foot, a plurality of pressure sensors may be installed on the pedal of the self-balancing vehicle. When the user uses the self-balancing vehicle, pressure data collected by the plurality of pressure sensors may be analyzed, and the state of the pressure parameter may be determined according to the analysis result.

In step 202, when the state of the pressure parameter indicates that a change has occurred in the pressure parameter, a state of a contact area parameter is acquired.

In the exemplary embodiment, when the user uses the self-balancing vehicle, the state of the pressure parameter on the pedal of the self-balancing vehicle may be monitored. When the state of the pressure parameter on the pedal of the self-balancing vehicle indicates that a change has occurred in the pressure parameter, the state of the contact area parameter input from the user through the pedal of the self-balancing vehicle may be acquired.

In step 203, when the state of the contact area parameter indicates that a change has occurred in the contact area parameter, the operation of the self-balancing vehicle is controlled according to the change.

In the exemplary embodiment, after the state of the contact area parameter is acquired, it may be judged whether the state of the contact area parameter indicates that a change has occurred in the contact area parameter. When it is determined that the state of the contact area parameter indicates that a change has occurred in the contact area parameter, it may be further judged whether a change in a value of the contact area parameter is larger than a threshold value. If the change in the value of contact area parameter is larger than the threshold value, the operation of the self-balancing vehicle is controlled according to the change in the value.

For example, the threshold value is preset for the contact area parameter of the self-balancing vehicle.

In one exemplary embodiment, when the state of the contact area parameter indicates that a front part of the user's foot is uplifted, the self-balancing vehicle is controlled to slow down according to a decrease in the value of the contact area parameter.

In the present embodiment, the self-balancing vehicle may be controlled to slow down according to a magnitude of the decrease in the value of the contact area parameter. The larger the decrease is, the larger the speed value of the self-balancing vehicle decreases.

In one exemplary embodiment, when the user uses the self-balancing vehicle having two pedals, a contact area between the user's feet and the self-balancing vehicle may be acquired. When the user uplifts a front part of each foot, it may be monitored that a value of the contact area between the user's feet and the self-balancing vehicle decreases. At this time, the self-balancing vehicle may be controlled to slow down according to a decrease in the value of the contact area. Thereby, the user may slow down the self-balancing vehicle by changing a state of the user's feet on the pedals of the self-balancing vehicle, which may avoid the user losing balance due to the user's leaning backward and the backward moving of the center of gravity of the user's body. Thereby, safety of the self-balancing vehicle is improved.

In one exemplary embodiment, when the state of the contact area parameter indicates that a heel of the user is uplifted, the self-balancing vehicle is controlled to speed up according to the decrease in the value of the contact area parameter.

In the present embodiment, the self-balancing vehicle may be controlled to speed up according to a magnitude of the decrease in the value the contact area parameter. The larger the decrease in the value is, the larger the speed value of the self-balancing vehicle increases.

For example, when the user uses the self-balancing vehicle having two pedals, a contact area between the feet and the self-balancing vehicle may be acquired. When the user uplifts the user's heels, it may be monitored that the contact area between the feet and the self-balancing vehicle decreases. At this time, the self-balancing vehicle may be controlled to speed up according to the decrease in the contact area. Thereby, the user may speed up the self-balancing vehicle by changing a state of the user's feet on the pedals of the self-balancing vehicle, which may avoid the user losing balance due to the user's leaning backward and the backward moving of the center of gravity of the user's body. Thereby, safety of the self-balancing vehicle is improved.

In the method 200, during a process of controlling operation of the self-balancing vehicle, the state of the pressure parameter input from the user through the pedal of the self-balancing vehicle is acquired. When the state of the pressure parameter indicates that a change has occurred in the pressure parameter, the state of the contact area parameter is acquired. When the state of the contact area parameter indicates that a change has occurred in the contact area parameter, the self-balancing vehicle is controlled according to the change. Therefore, the user may control the operation of the self-balancing vehicle by changing the state of the user's feet on the self-balancing vehicle, which facilitates the user to control the self-balancing vehicle, and avoids that the user loses balance due to the user's leaning backward and the backward moving of the center of gravity of the user's body. Thereby, safety of the self-balancing vehicle is improved.

Figure 3:
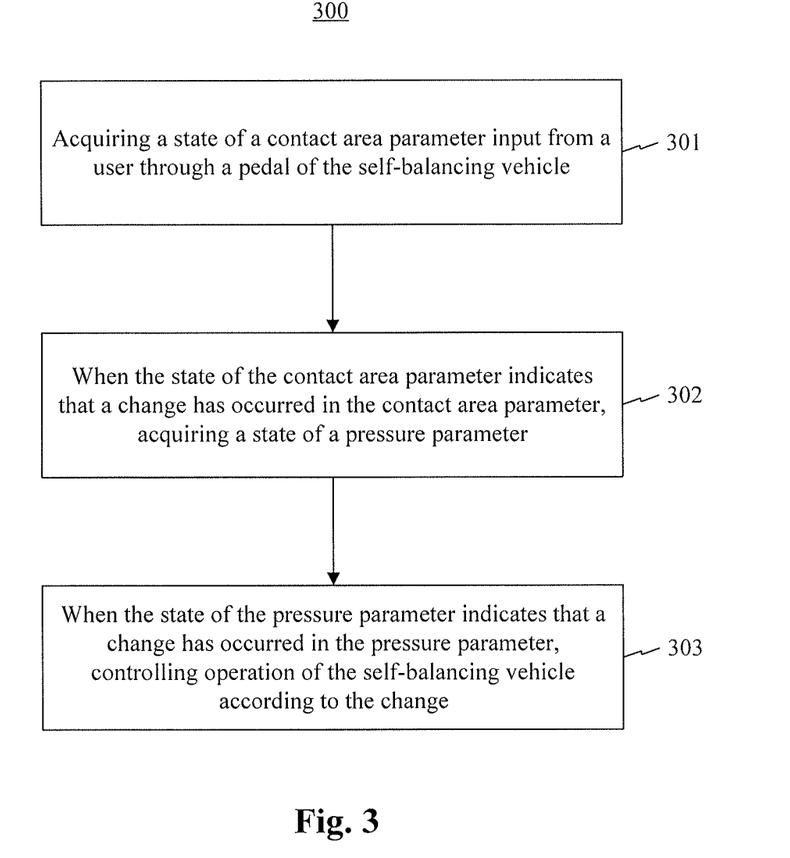
FIG. 3 is a flow chart of a method for controlling a self-balancing vehicle according to another exemplary embodiment.

FIG. 3 is a flow chart of a method 300 for controlling a self-balancing vehicle according to another exemplary embodiment. As shown in FIG. 3, the method 300 includes the following steps.

In step 301, a state of a contact area parameter input from a user through a pedal of the self-balancing vehicle is acquired.

In the exemplary embodiment, when the user uses the self-balancing vehicle, contact area data of the user's foot on the pedal may be acquired by a touch sensor on the pedal. The acquired contact area data may be analyzed through the touch sensor, and the state of the contact area parameter input from the user through the pedal of the self-balancing vehicle is determined according to the analysis result.

In step 302, when the state of the contact area parameter indicates that a change has occurred in the contact area parameter, a state of a pressure parameter is acquired.

In the exemplary embodiment, when the user uses the self-balancing vehicle, the state of the contact area parameter may be monitored. When it is monitored that a change has occurred in the state of the contact area parameter, it may be determined that a value of the contact area parameter changes. In order to accurately control the operation of the self-balancing vehicle, the state of the pressure parameter input from the user through the pedal of the self-balancing vehicle is further acquired.

In step 303, when the state of the pressure parameter indicates that a change has occurred in the pressure parameter, operation of the self-balancing vehicle is controlled according to the change.

In the exemplary embodiment, after the state of the pressure parameter is acquired, it may be judged whether the state of the pressure parameter indicates that a change has occurred in the pressure parameter. When it is determined that the state of the pressure parameter indicates that a change has occurred in the pressure parameter, it may be further judged whether a change in the value of the pressure parameter is larger than a threshold value. If the change in the value of the pressure parameter is larger than the threshold value, the operation of the self-balancing vehicle is controlled according to the change.

For example, the threshold value is preset for the pressure parameter of the self-balancing vehicle.

In one exemplary embodiment, when the state of the pressure parameter indicates that a change has occurred in the pressure parameter, a change in a value of the pressure parameter at a front part of the user's foot, input through the pedal of the self-balancing vehicle, may be further acquired. If it is determined that the value of the pressure parameter at the front part of the user's foot decreases, it may be further judged whether a decreases in the value of the pressure parameter is larger than a threshold value. If the decrease in the value of the pressure parameter is larger than the threshold value, the self-balancing vehicle is controlled to slow down according to the decrease in the value.

In the present embodiment, the self-balancing vehicle may be controlled to slow down according to a magnitude of the decrease in the value of the pressure parameter. The larger the decrease in the value is, the larger the speed value of the self-balancing vehicle decreases.

In one exemplary embodiment, if it is determined that the value of the pressure parameter at the front part of the user's foot increases, it may be further judged whether an increase in the value of the pressure parameter is larger than a threshold value. If the increase in the value of the pressure parameter is larger than the threshold value, the self-balancing vehicle is controlled to speed up according to the increase in the value.

In the present embodiment, the self-balancing vehicle may be controlled to speed up according to a magnitude of the increase in the value of the pressure parameter. The larger the increase in the value is, the larger the speed value of the self-balancing vehicle increases.

For example, to determine that the value of the pressure parameter at the front part of the user's foot increases, the self-balancing vehicle may analyze a distribution of the pressure parameter on the pedal of the self-balancing vehicle.

It should be understood that, the threshold values for different parameters may be preset for the self-balancing vehicle. A threshold value may be the same as or different from another threshold value, which is not limited in the present disclosure.

In the method 300, during a process of controlling operation of the self-balancing vehicle, the state of the contact area parameter input from the user through the pedal of the self-balancing vehicle is acquired. When the state of the contact area parameter indicates that a change has occurred in the contact area parameter, the state of the pressure parameter is acquired. When the state of the pressure parameter indicates that a change has occurred in the pressure parameter, the self-balancing vehicle is controlled according to the change in the value. Therefore, the user may control the operation of the self-balancing vehicle by changing a state of the user's feet on the self-balancing vehicle, which facilitates the user to control the self-balancing vehicle, and avoids that the user loses balance due to the user's leaning backward and the backward moving of the center of gravity of the user's body. Thereby, safety of the self-balancing vehicle is improved.

Exemplary embodiments of the present disclosure also provide apparatuses for controlling a self-balancing vehicle. Each of the apparatuses is applicable in a self-balancing vehicle having a pedal, and may be implemented through software, or hardware, or a combination thereof.

Figure 4:
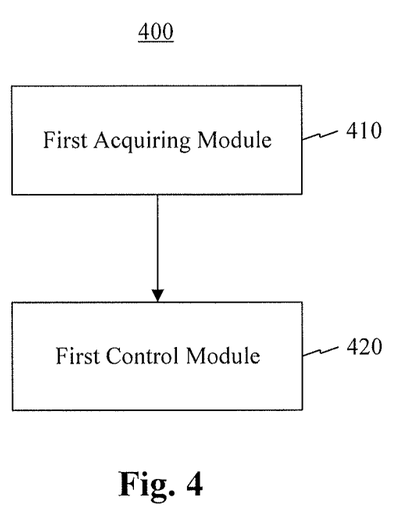
FIG. 4 is a block diagram of an apparatus for controlling a self-balancing vehicle according to an exemplary embodiment.

FIG. 4 is a block diagram of an apparatus 400 for controlling a self-balancing vehicle, according to an exemplary embodiment. As shown in FIG. 4, the apparatus 400 includes a first acquiring module 410 and a first control module 420.

The first acquiring module 410 is configured to acquire a state of a parameter input from a user through a pedal of the self-balancing vehicle.

In the exemplary embodiment, the parameter includes at least one of: a pressure parameter, and a contact area parameter between a foot of the user and the pedal of the self-balancing vehicle.

The first control module 420 is configured to, when the state of the parameter indicates that a change has occurred in the parameter, control operation of the self-balancing vehicle according to the change.

Figure 5:
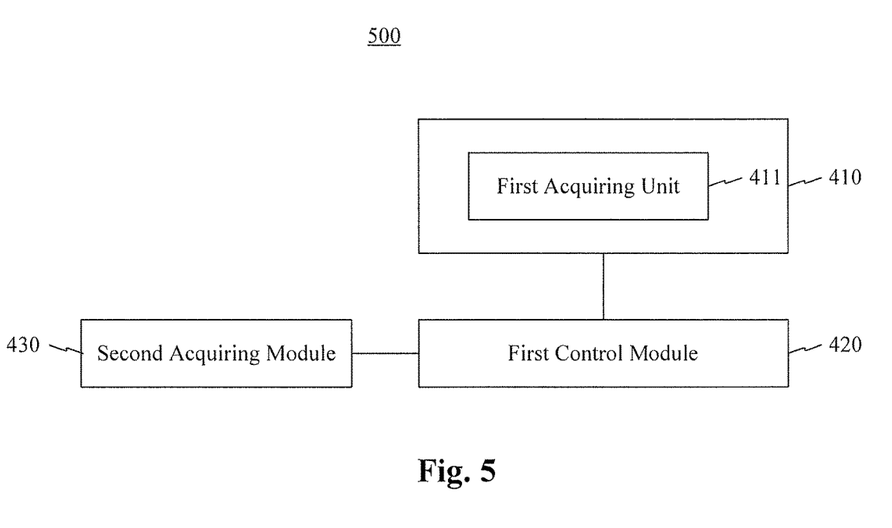
FIG. 5 is a block diagram of an apparatus for controlling a self-balancing vehicle according to another exemplary embodiment.

FIG. 5 is a block diagram of an apparatus 500 for controlling a self-balancing vehicle, according to another exemplary embodiment. As shown in FIG. 5, the apparatus 500 further includes a second acquiring module 430, in addition to the first acquiring module 410 and the first control module 420 (FIG. 4).

The second acquiring module 430 is configured to acquire a state of a pressure parameter.

The first acquiring module 410 includes a first acquiring unit 411. The first acquiring unit 411 is configured to, when the state of the pressure parameter indicates that a change has occurred in the pressure parameter, acquire a state of a contact area parameter.

Figure 6:
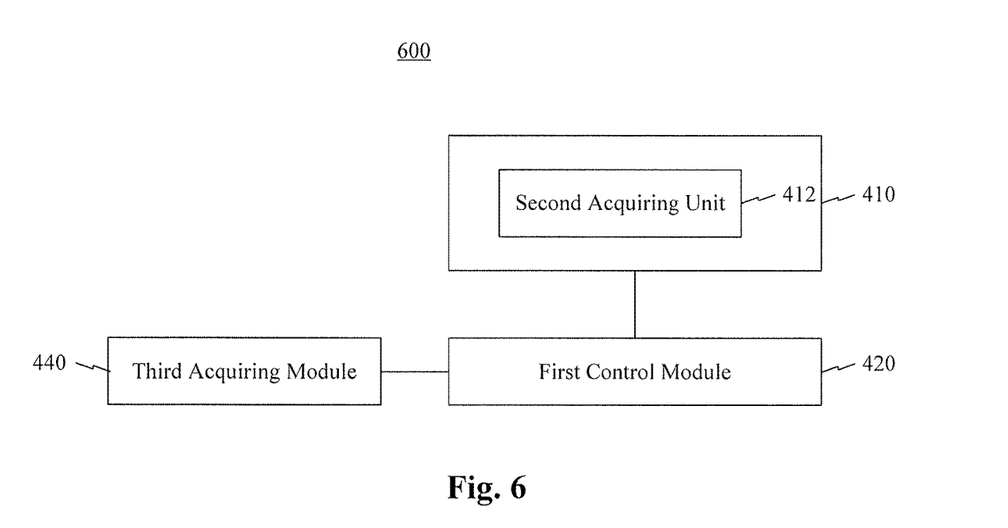
FIG. 6 is a block diagram of an apparatus for controlling a self-balancing vehicle according to another exemplary embodiment.

FIG. 6 is a block diagram of an apparatus 600 for controlling a self-balancing vehicle, according to another exemplary embodiment. As shown in FIG. 6, the apparatus 600 further includes a third acquiring module 440, in addition to the first acquiring module 410 and the first control module 420 (FIG. 4).

The third acquiring module 440 is configured to acquire a state of a contact area parameter.

The first acquiring module 410 includes a second acquiring unit 412. The second acquiring unit 412 is configured to, when the state of the contact area parameter indicates that a change has occurred in the contact area parameter, acquire a state of a pressure parameter.

Figure 7:
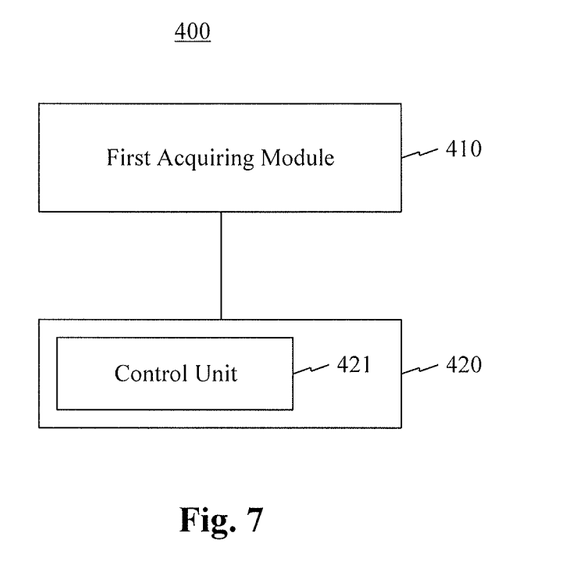
FIG. 7 is a block diagram of an apparatus for controlling a self-balancing vehicle according to another exemplary embodiment.

FIG. 7 is a block diagram of the apparatus 400 (FIG. 4) for controlling a self-balancing vehicle, according to another exemplary embodiment. As shown in FIG. 7, the first control module 420 includes a control unit 421.

The control unit 421 is configured to, when a state of a parameter indicates that a change has occurred in the parameter, and a change in a value of the parameter is larger than a threshold value, control operation of the self-balancing vehicle according to the change in the value.

Figure 8:
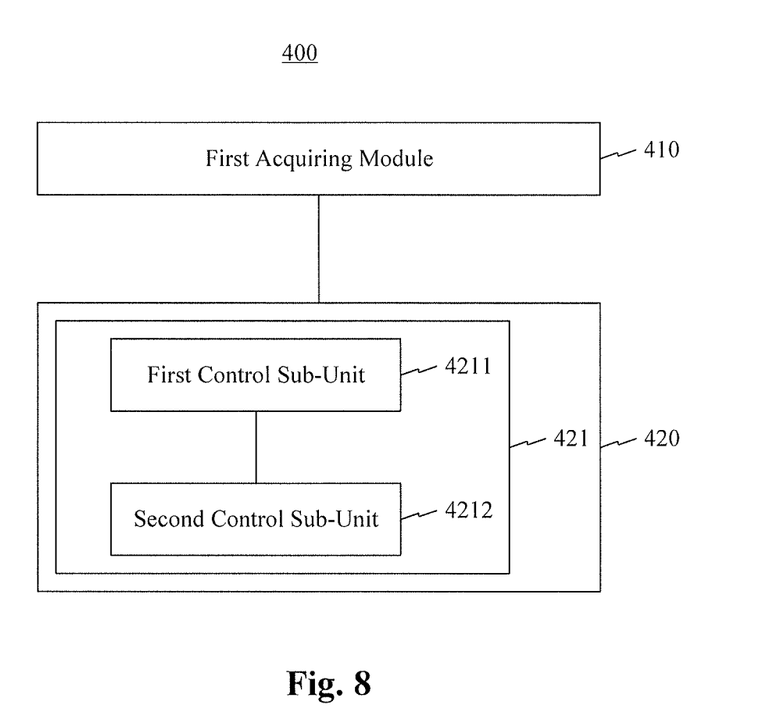
FIG. 8 is a block diagram of an apparatus for controlling a self-balancing vehicle according to another exemplary embodiment.

FIG. 8 is a block diagram of the apparatus 400 (FIG. 7) for controlling a self-balancing vehicle, according to another exemplary embodiment. As shown in FIG. 8, the control unit 421 includes a first control sub-unit 4211 and a second control sub-unit 4212.

The first control sub-unit 4211 is configured to, when a decrease in a value of a parameter is larger than a first threshold value, control the self-balancing vehicle to slow down according to the decrease in the value.

The second control sub-unit 4212 is configured to, when an increase in the value of the parameter is larger than a second threshold value, control the self-balancing vehicle to speed up according to the increase in the value.

Figure 9:
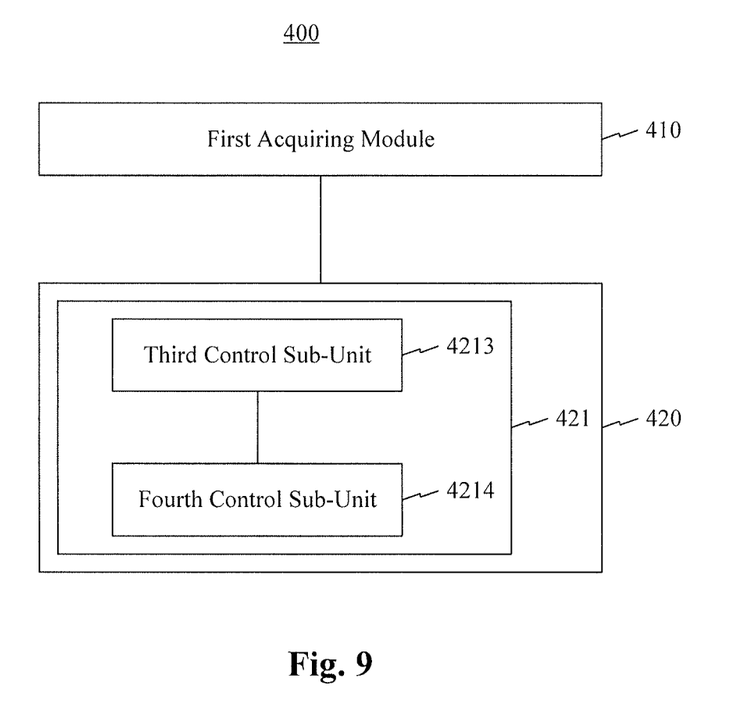
FIG. 9 is a block diagram of an apparatus for controlling a self-balancing vehicle according to another exemplary embodiment.

FIG. 9 is a block diagram of the apparatus 400 (FIG. 7) for controlling a self-balancing vehicle, according to another exemplary embodiment. As shown in FIG. 9, the control unit 421 includes a third control sub-unit 4213 and a fourth control sub-unit 4214.

The third control sub-unit 4213 is configured to, when a state of a contact area parameter indicates that a front part of the user's foot is uplifted, control the self-balancing vehicle to slow down according to a decrease in a value of the contact area parameter.

The fourth control sub-unit 4214 is configured to, when the state of the contact area parameter indicates that a heel of the user is uplifted, control the self-balancing vehicle to speed up according to a decrease in the value of the contact area parameter.

Figure 10:
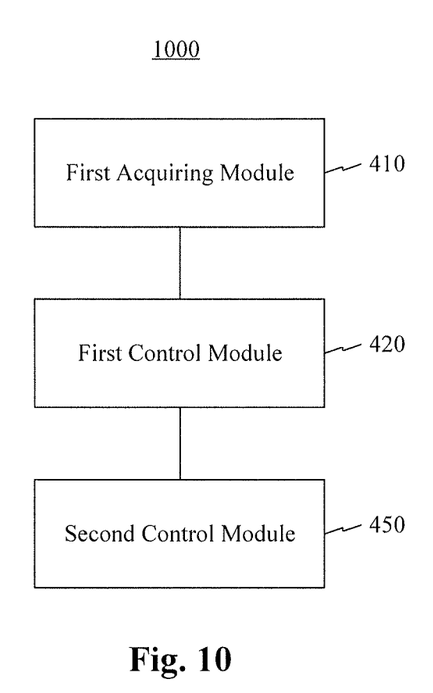
FIG. 10 is a block diagram of an apparatus for controlling a self-balancing vehicle according to another exemplary embodiment.

FIG. 10 is a block diagram of an apparatus 1000 for controlling a self-balancing vehicle, according to another exemplary embodiment. As shown in FIG. 10, the apparatus 1000 further includes a second control module 450, in addition to the first acquiring module 410 and the first control module 420 (FIG. 4).

The second control module 450 is configured to, when a state of a parameter indicates that the parameter is the same as that before the change occurs, control the self-balancing vehicle to maintain a current speed.

The embodiments of apparatuses described above are merely illustrative. The modules/units may or may not be physically separate. The modules/units may be at the same location or distributed over a network. One of ordinary skill in the art will understand that the modules/units can each be implemented by hardware, or software, or a combination of hardware and software. One of ordinary skill in the art will also understand that multiple ones of the above described modules/units may be combined as one module/unit, and each of the above described modules/units may be further divided into a plurality of sub-modules/sub-units.

Figure 11:
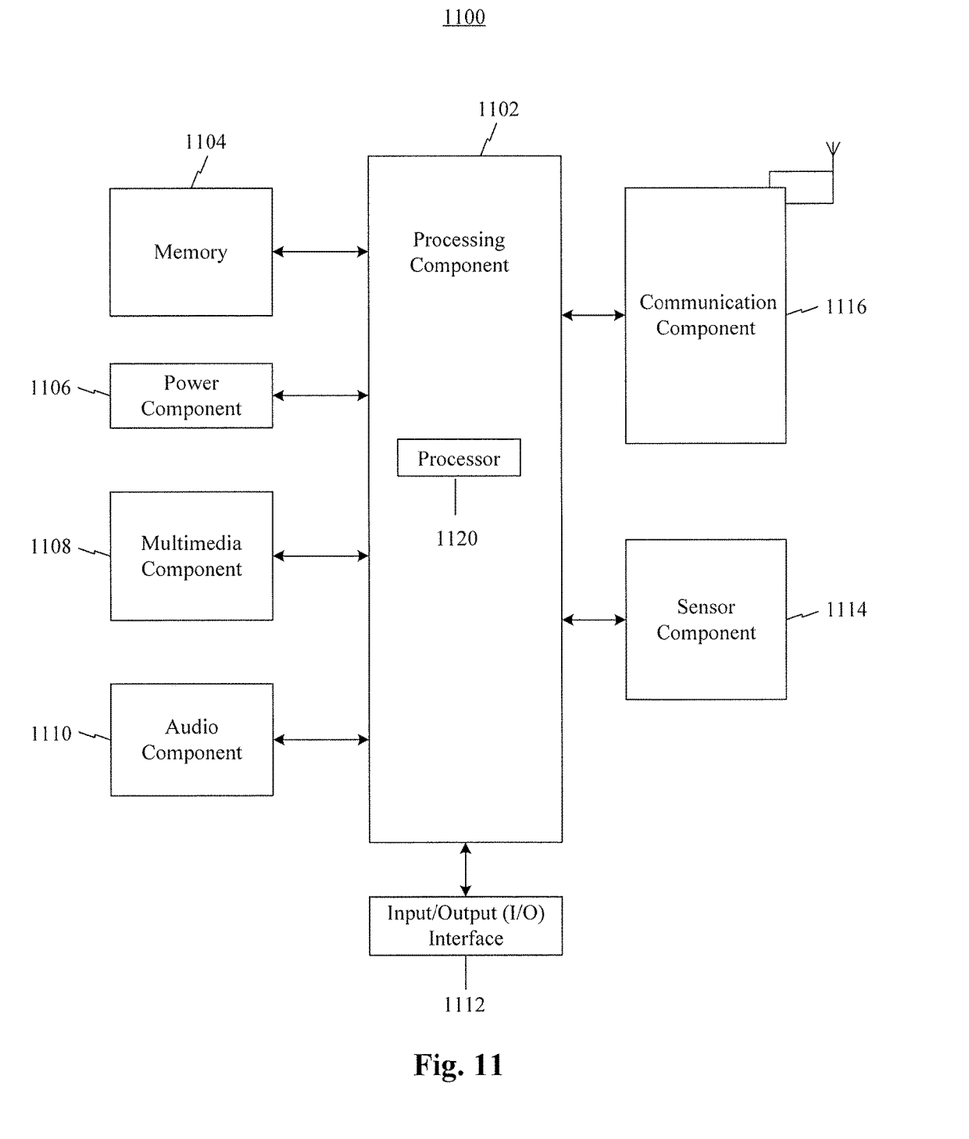
FIG. 11 is a block diagram of an apparatus for controlling a self-balancing vehicle according to an exemplary embodiment.

FIG. 11 is a block diagram of an apparatus 1100 for controlling a self-balancing vehicle, according to an exemplary embodiment. Referring to FIG. 11, the apparatus 1100 may include one or more of the following components: a processing component 1102, a memory 1104, a power component 1106, a multimedia component 1108, an audio component 1110, an input/output (I/O) interface 1112, a sensor component 1114, and a communication component 1116.

The processing component 1102 typically controls overall operations of the apparatus 1100, such as the operations associated with display, telephone calls, data communications, camera operations, and recording operations. The processing component 1102 may include one or more processors 1120 to execute instructions to perform all or part of the steps in the above described methods. Moreover, the processing component 1102 may include one or more modules which facilitate the interaction between the processing component 1102 and other components. For instance, the processing component 1102 may include a multimedia module to facilitate the interaction between the multimedia component 1108 and the processing component 1102.

The memory 1104 is configured to store various types of data to support the operation of the apparatus 1100. Examples of such data include instructions for any applications or methods operated on the apparatus 1100, contact data, phonebook data, messages, pictures, video, etc. The memory 1104 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 1106 provides power to various components of the apparatus 1100. The power component 1106 may include a power management system, one or more power sources, and any other components associated with the generation, management, and distribution of power in the apparatus 1100.

The multimedia component 1108 includes a screen providing an output interface between the apparatus 1100 and the user. In some embodiments, the screen may include a liquid crystal display (LCD) and a touch panel. If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 1108 includes a front camera and/or a rear camera. The front camera and the rear camera may receive an external multimedia datum while the apparatus 1100 is in an operation mode, such as a photographing mode or a video mode. Each of the front camera and the rear camera may be a fixed optical lens system or have focus and optical zoom capability.

The audio component 1110 is configured to output and/or input audio signals. For example, the audio component 1110 includes a microphone configured to receive an external audio signal when the apparatus 1100 is in an operation mode, such as a call mode, a recording mode, and a voice recognition mode. The received audio signal may be further stored in the memory 1104 or transmitted via the communication component 1116. In some embodiments, the audio component 1110 further includes a speaker to output audio signals.

The I/O interface 1112 provides an interface between the processing component 1102 and peripheral interface modules, such as a keyboard, a click wheel, buttons, and the like. The buttons may include, but are not limited to, a home button, a volume button, a starting button, and a locking button.

The sensor component 1114 includes one or more sensors to provide status assessments of various aspects of the apparatus 1100. For instance, the sensor component 1114 may monitor an open/closed status of the apparatus 1100, relative positioning of components, e.g., the display and the keypad, of the apparatus 1100, a change in position of the apparatus 1100 or a component of the apparatus 1100, a presence or absence of user contact with the apparatus 1100, an orientation or an acceleration/deceleration of the apparatus 1100, and a change in temperature of the apparatus 1100. The sensor component 1114 may include a proximity sensor configured to monitor the presence of nearby objects without any physical contact. The sensor component 1114 may also include a light sensor, such as a CMOS or CCD image sensor, for use in imaging applications. In some embodiments, the sensor component 1114 may also include an accelerometer sensor, a gyroscope sensor, a magnetic sensor, a pressure sensor, or a temperature sensor.

The communication component 1116 is configured to facilitate communication, wired or wirelessly, between the apparatus 1100 and other devices. The apparatus 1100 can access a wireless network based on a communication standard, such as WiFi, 2G, 3G, or 4G, or a combination thereof. In one exemplary embodiment, the communication component 1116 receives a broadcast signal or broadcast associated information from an external broadcast management system via a broadcast channel. In one exemplary embodiment, the communication component 1116 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the apparatus 1100 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In exemplary embodiments, there is also provided a non-transitory computer-readable storage medium including instructions, such as included in the memory 1104, executable by the processor 1120 of the apparatus 1100, for performing the above-described methods. For example, the non-transitory computer-readable storage medium may be a ROM, a RAM, a CD-ROM, a magnetic tape, a floppy disc, an optical data storage device, and the like.

Other embodiments of the present disclosure will be apparent to those skilled in the art from consideration of the specification and practice of the present disclosure disclosed here. This application is intended to cover any variations, uses, or adaptations of the present disclosure following the general principles thereof and including such departures from the present disclosure as come within known or customary practice in the art. It is intended that the specification and examples be considered as exemplary only, with a true scope and spirit of the present disclosure being indicated by the following claims.

It will be appreciated that the present disclosure is not limited to the exact construction that has been described above and illustrated in the accompanying drawings, and that various modifications and changes can be made without departing from the scope thereof. It is intended that the scope of the present disclosure only be limited by the appended claims.

What is claimed is:

1. A method for controlling a self-balancing vehicle, comprising:
   acquiring a state of a parameter input from a user through a pedal of the self-balancing vehicle, the parameter being different from a center of gravity of the user; and
   when the state of the parameter indicates that a change in a value of the parameter has occurred, comparing the change in the value of the parameter to a threshold value; and
   when the change in the value of the parameter is larger than the threshold value, controlling operation of the self-balancing vehicle according to the change.

2. The method of claim 1, wherein the parameter comprises at least one of: a pressure parameter, and a contact area parameter between a foot of the user and the pedal of the self-balancing vehicle.

3. The method of claim 2, wherein when the parameter includes the contact area parameter, the method further comprises:
   acquiring a state of the pressure parameter; and
   the acquiring the state of the parameter input from the user through the pedal of the self-balancing vehicle includes:
   when the state of the pressure parameter indicates that a change has occurred in the pressure parameter, acquiring a state of the contact area parameter.

4. The method of claim 2, wherein when the parameter includes the pressure parameter, the method further comprises:
   acquiring a state of the contact area parameter; and
   the acquiring the state of the parameter input from the user through the pedal of the self-balancing vehicle includes:
   when the state of the contact area parameter indicates that a change has occurred in the contact area parameter, acquiring a state of the pressure parameter.

5. The method of claim 2, wherein when the parameter includes the contact area parameter, the method further comprising:
   when the state of the contact area parameter indicates that a front part of the foot of the user is uplifted, controlling the self-balancing vehicle to slow down according to a decrease in a value of the contact area parameter; and
   when the state of the contact area parameter indicates that a heel of the user is uplifted, controlling the self-balancing vehicle to speed up according to a decrease in the value of the contact area parameter.

6. The method of claim 1, wherein the change in the value of the parameter is a decrease in the value of the parameter, and when the decrease in the value of the parameter is larger than the threshold value, controlling the operation of the self-balancing vehicle to slow down according to the decrease in the value.

7. The method of claim 1, wherein the change in the value of the parameter is an increase in the value of the parameter, and when the increase in the value of the parameter is larger than the threshold value, controlling the self-balancing vehicle to speed up according to the increase in the value.

8. The method of claim 1, wherein after controlling the operation of the self-balancing vehicle according to the change, the method further comprises:
   when the state of the parameter indicates that the parameter is the same as that before the change occurs, controlling the self-balancing vehicle to maintain a current speed.

9. An apparatus for controlling a self-balancing vehicle, comprising:
   a processor; and
   a memory for storing instructions executable by the processor,
   wherein the processor is configured to:
   acquire a state of a parameter input from a user through a pedal of the self-balancing vehicle, the parameter being different from a center of gravity of the user; and
   when the state of the parameter indicates that a change in a value of the parameter has occurred, compare the change in the value of the parameter to a threshold value; and
   when the change in the value of the parameter is larger than the threshold value, control operation of the self-balancing vehicle according to the change.

10. The apparatus of claim 9, wherein the parameter comprises at least one of: a pressure parameter, and a contact area parameter between a foot of the user and the pedal of the self-balancing vehicle.

11. The apparatus of claim 10, wherein when the parameter includes the contact area parameter, the processor is further configured to:
   acquire a state of the pressure parameter; and when the state of the pressure parameter indicates that a change has occurred in the pressure parameter, acquire a state of the contact area parameter.

12. The apparatus of claim 10, wherein when the parameter includes the pressure parameter, the processor is further configured to:
    acquire a state of the contact area parameter; and
    when the state of the contact area parameter indicates that a change has occurred in the contact area parameter, acquire a state of the pressure parameter.

13. The apparatus of claim 10, wherein when the parameter includes the contact area parameter, the processor is further configured to:
    when the state of the contact area parameter indicates that a front part of the foot of the user is uplifted, control the self-balancing vehicle to slow down according to a decrease in a value of the contact area parameter; and
    when the state of the contact area parameter indicates that a heel of the user is uplifted, control the self-balancing vehicle to speed up according to a decrease in the value of the contact area parameter.

14. The apparatus of claim 9, wherein the change in the value of the parameter is a decrease in the value of the parameter, and wherein the processor is further configured to:
    when the decrease in the value of the parameter is larger than the threshold value, controlling the operation of the self-balancing vehicle to slow down according to the decrease in the value.

15. The apparatus of claim 9, wherein the change in the value of the parameter is an increase in the value of the parameter, and wherein the processor is further configured to:
    when the increase in the value of the parameter is larger than the threshold value, control the self-balancing vehicle to speed up according to the increase in the value.

16. The apparatus of claim 9, wherein after controlling the operation of the self-balancing vehicle according to the change, the processor is further configured to:
    when the state of the parameter indicates that the parameter is the same as that before the change occurs, control the self-balancing vehicle to maintain a current speed.

17. A non-transitory computer-readable storage medium having stored therein instructions that, when executed by a processor of an apparatus, cause the apparatus to perform a method for controlling a self-balancing vehicle, the method comprising:
    acquiring a state of a parameter input from a user through a pedal of the self-balancing vehicle, the parameter being different from a center of gravity of the user; and
    when the state of the parameter indicates that a change in a value of the parameter has occurred, comparing the change in the value of the parameter to a threshold value; and
    when the change in the value of the parameter is larger than the threshold value, controlling operation of the self-balancing vehicle according to the change.

* * * * *